UNITED STATES PATENT OFFICE 2,383,719

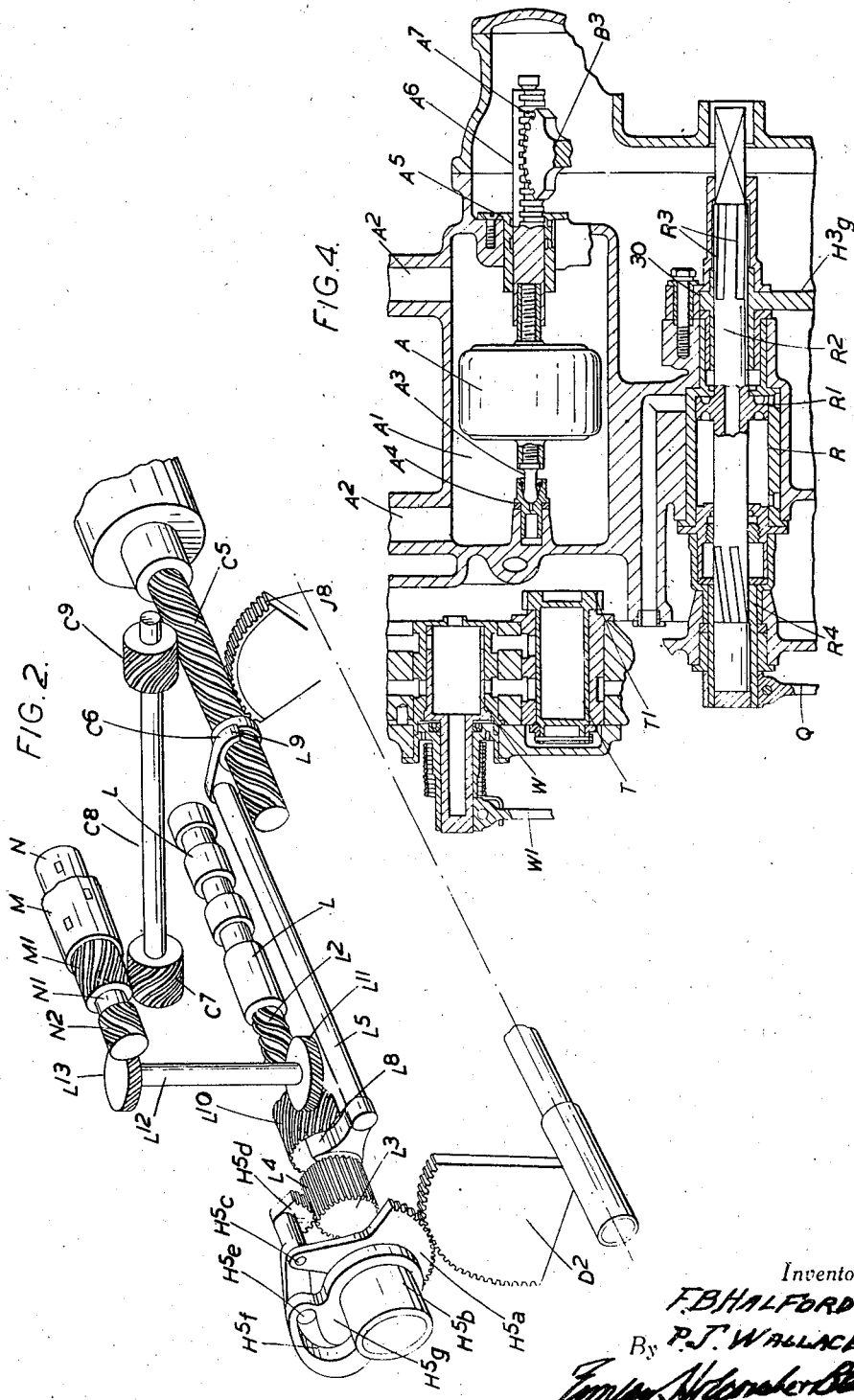

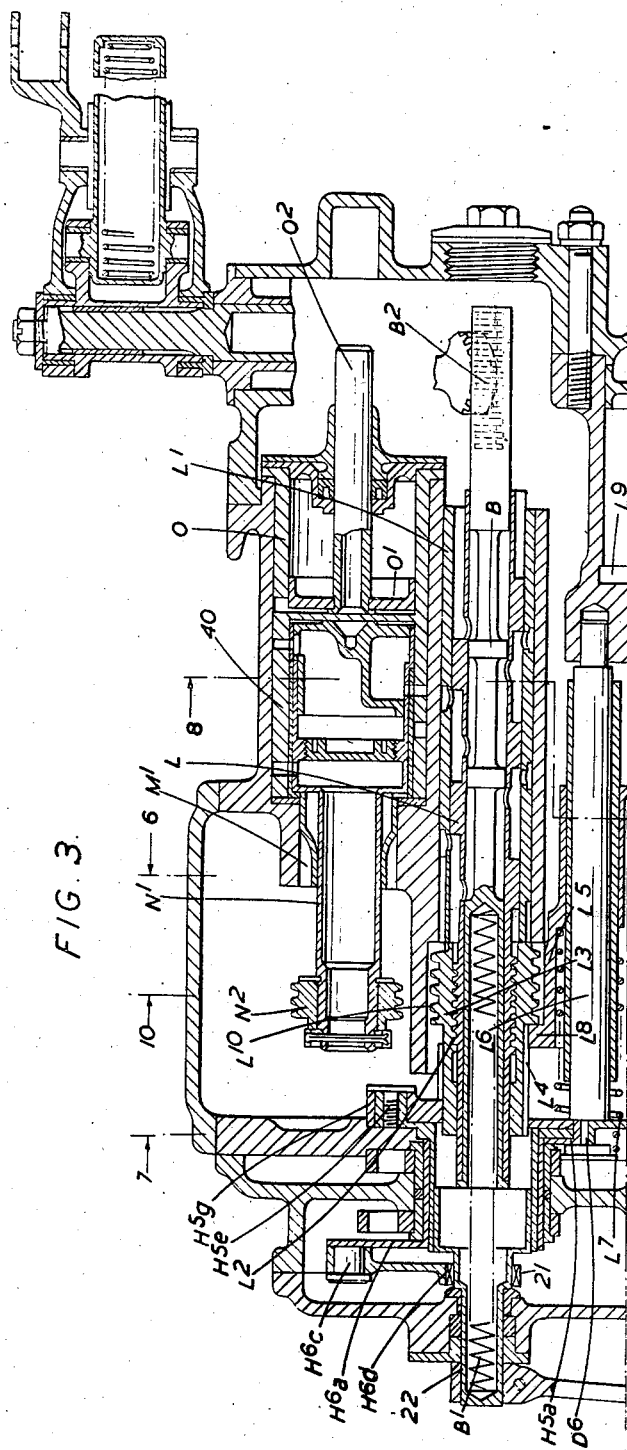

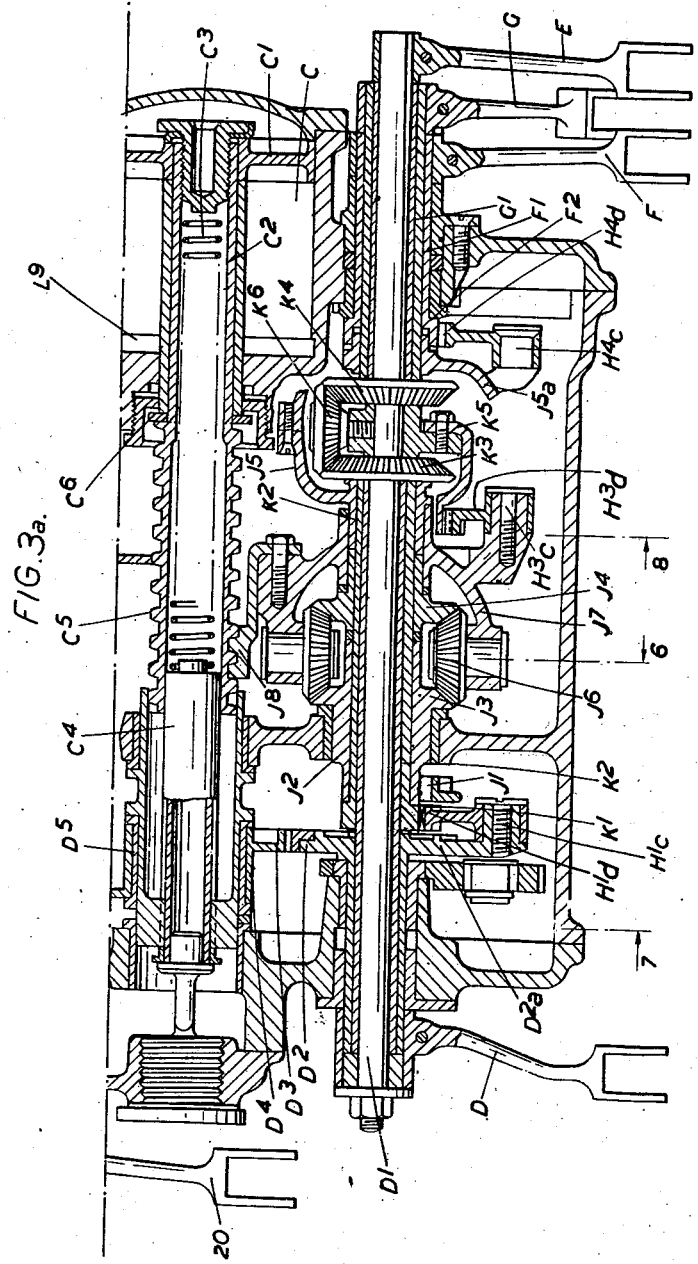

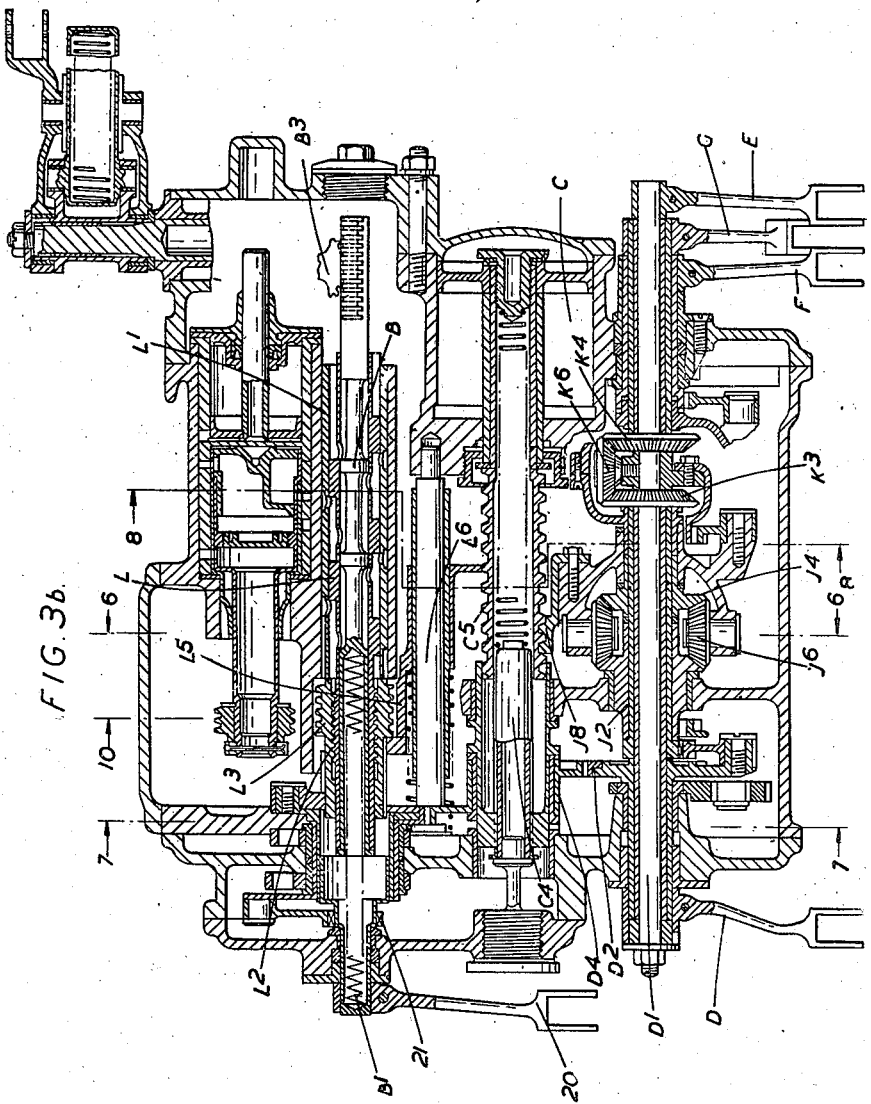

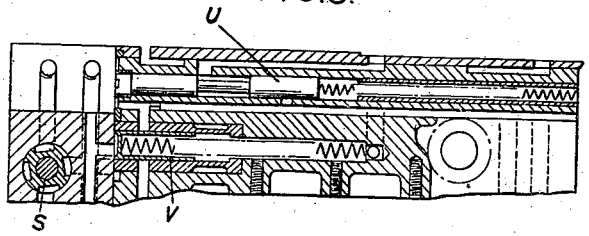
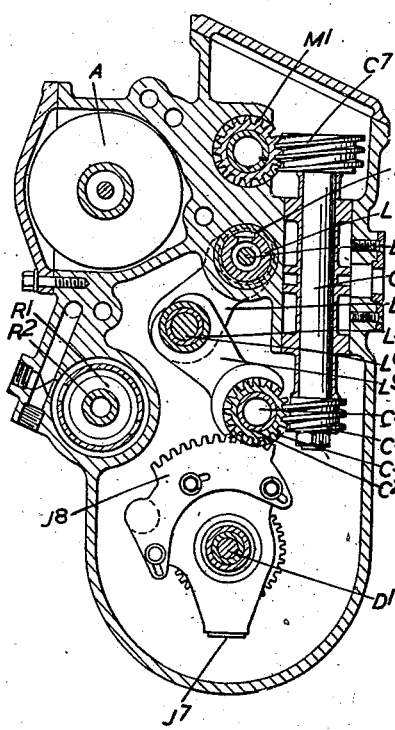
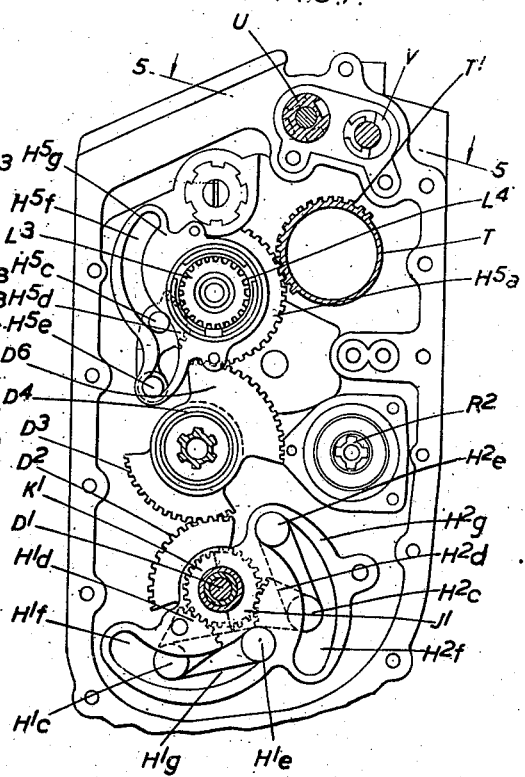

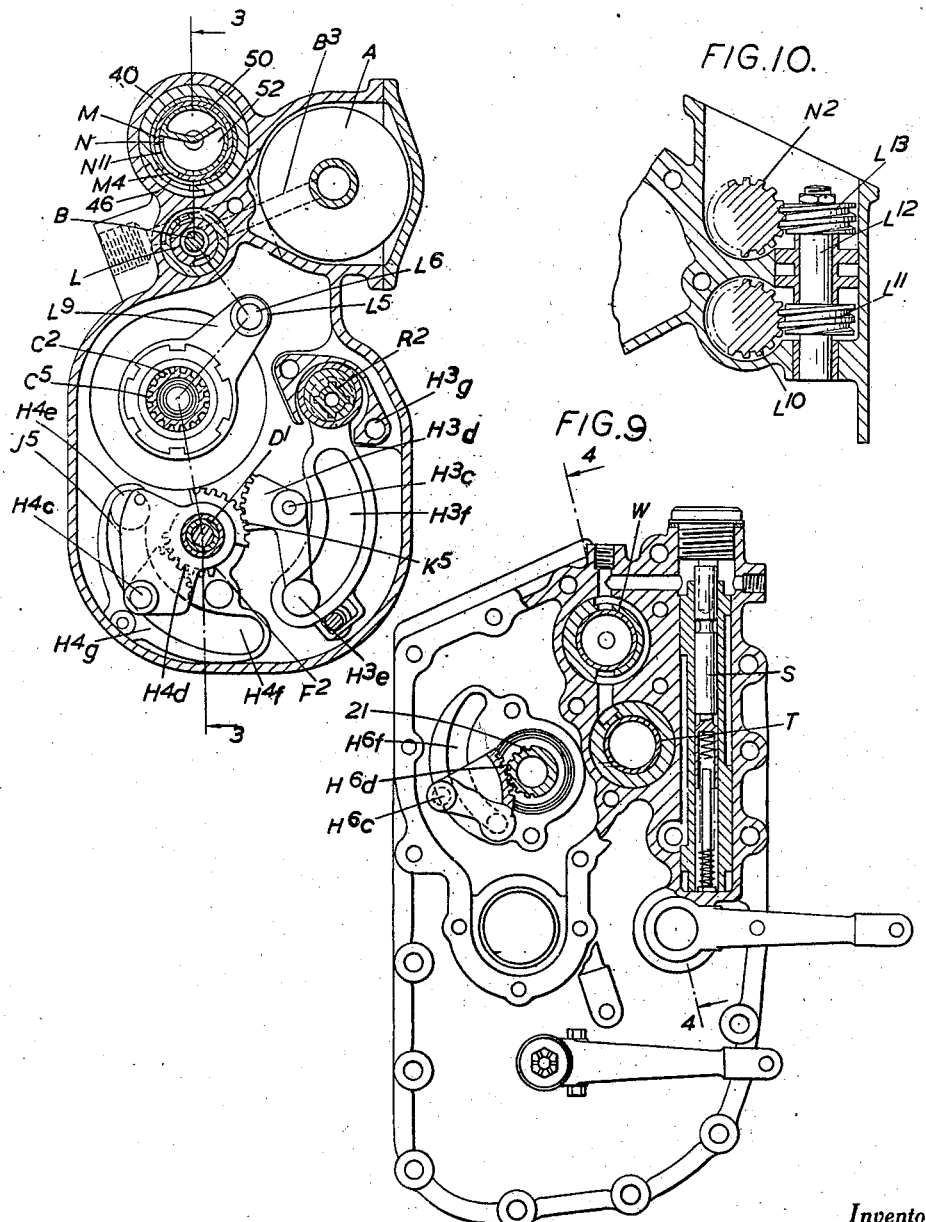

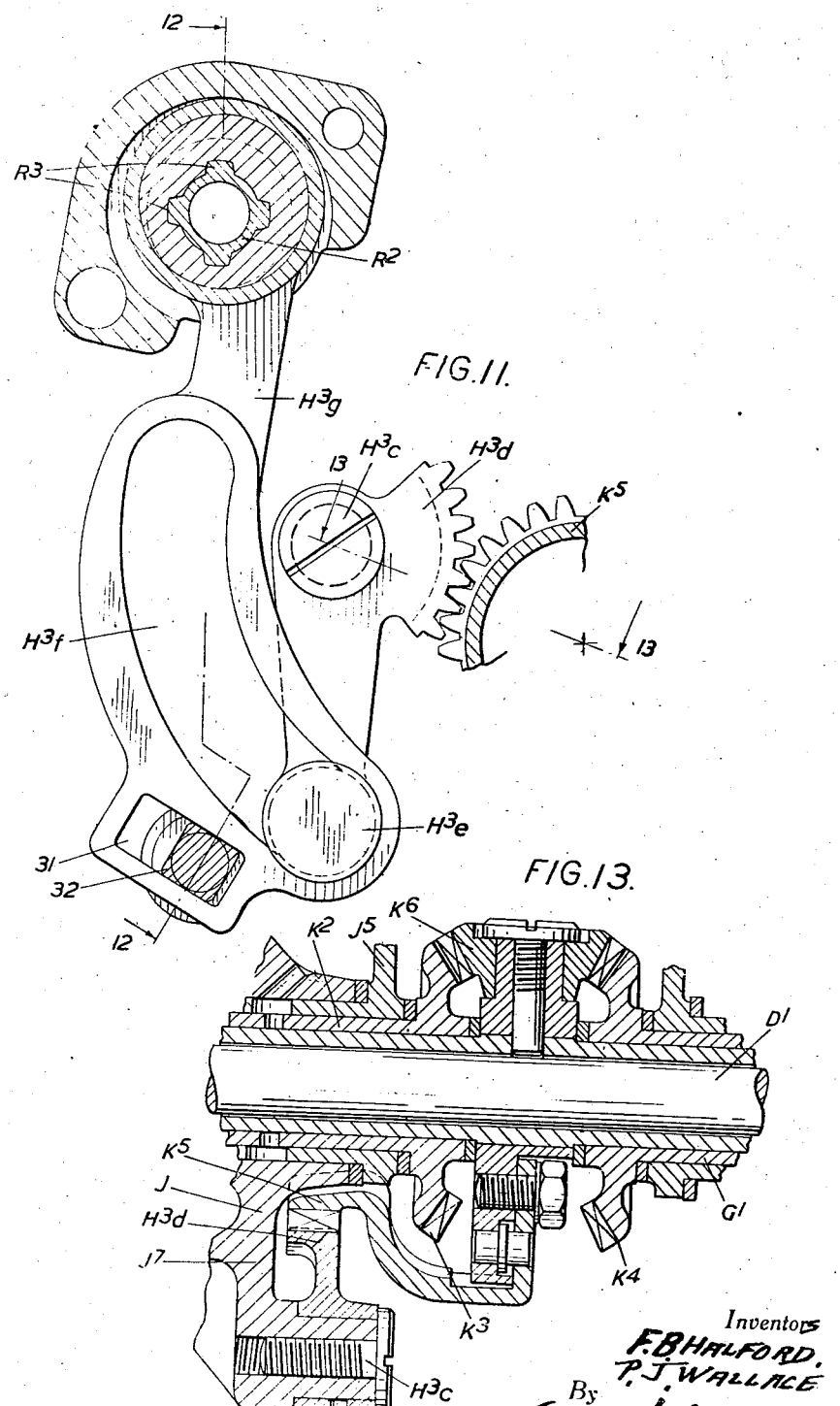

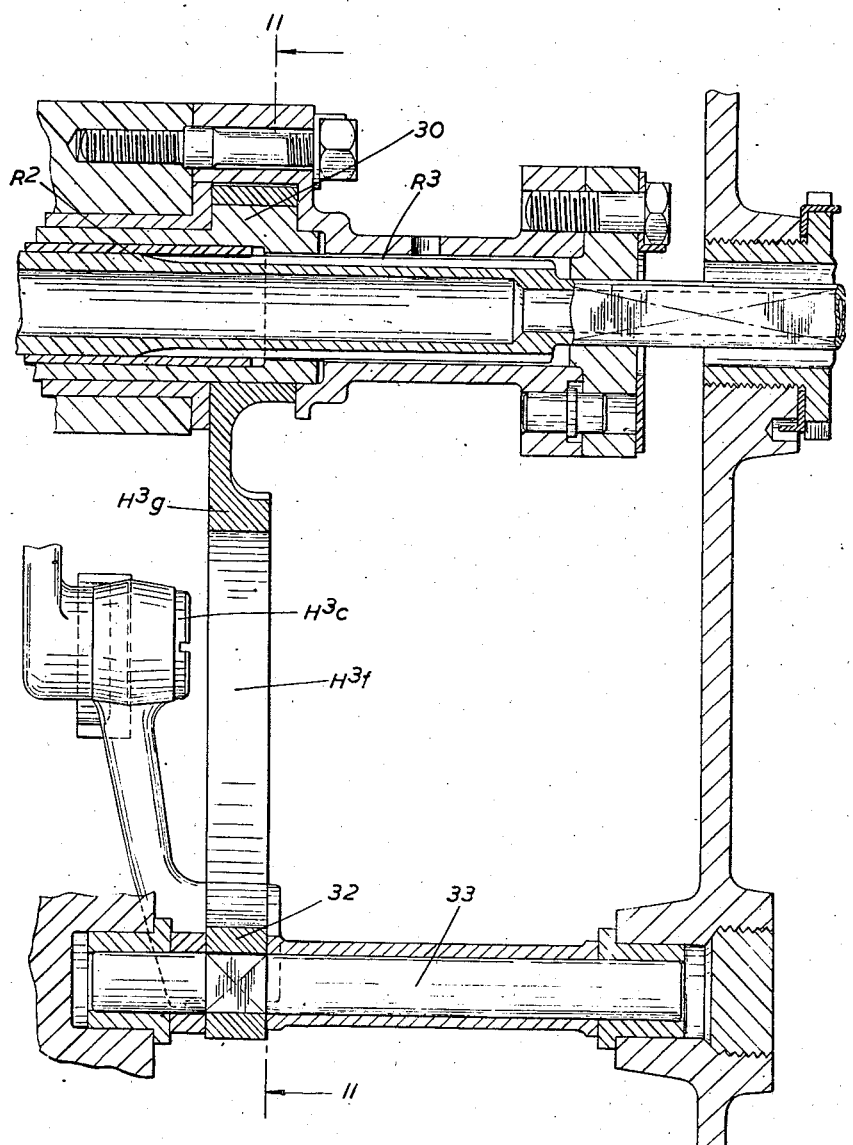

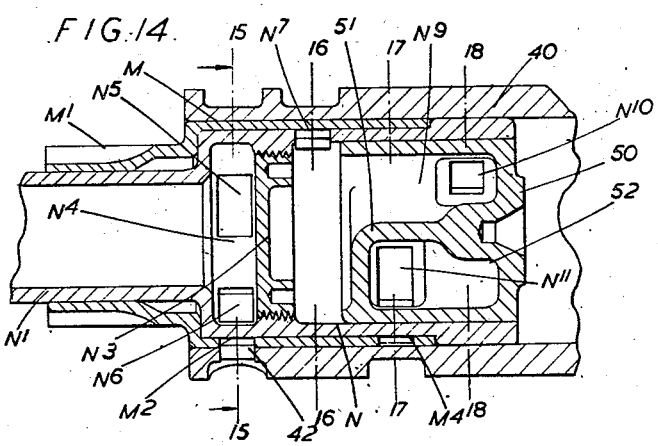
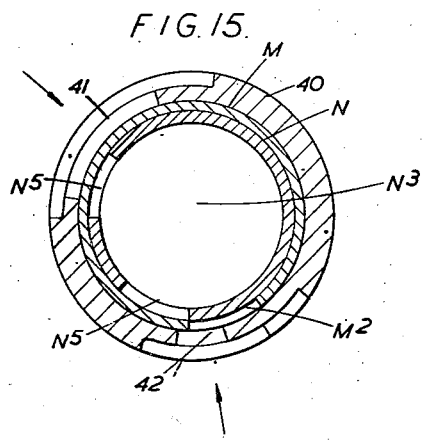
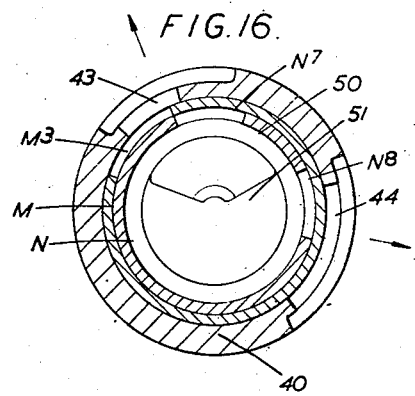
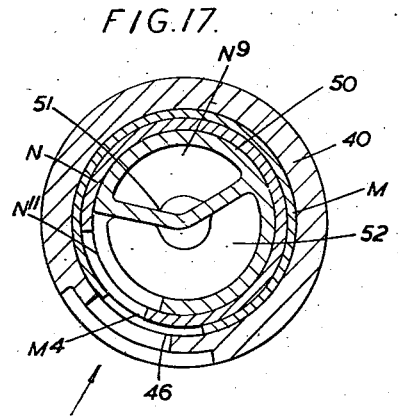
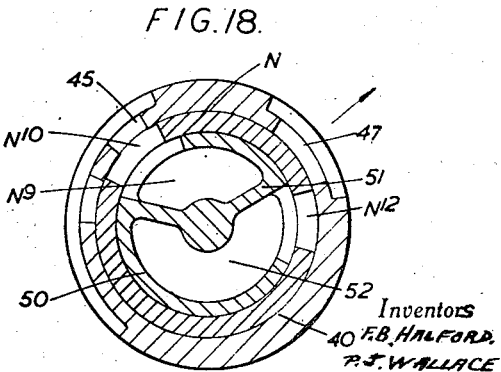

APPARATUS FOR THE CONTROL OF INTERNAL-COMBUSTION ENGINES

Frank Bernard Halford, Edgware, and Percy John Wallace, Harrow Weald, England, assignors to D. Napier & Son Limited, London, England, a company of Great Britain Application December 5, 1942, Serial No. 467,976
In Great Britain October 13, 1941

7 Claims. (Cl. 123—119)

This invention relates to apparatus for the control of internal combustion engines as used for the propulsion of aircraft and has for its object to effect such interconnection of the various engine controls as will result in certain definite advantages. As for instance to give relief to the pilot of an aircraft by providing only a single lever which it is necessary to move in place of several control levers, and to correlate the various control movements with certain engine characteristics whereby the best engine performance will tend to be obtained at all times. The apparatus should also prevent or minimise the risk of mishandling the engine.

The following points call for consideration in the devising of apparatus such as that comprised in the present invention. Faulty manipulation of the engine will have one or more undesirable effects, as for instance it will result in failure to get the required power, or this power will tend to be obtained at the cost of increased fuel consumption and consequent loss of flying range, it may lead to premature wear or even serious damage to the engine. With military aircraft it is almost impossible for the pilot to manipulate separately the various engine controls so as to get from the engine the best performance at all times. Thus correct use of the lever controlling the fuel mixture is needed to obtain extreme flying range. Then to get the maximum rate of climb necessitates change to high gear in the supercharger drive within narrow limits of altitude and performance may be seriously impaired by premature or delayed gear change. Again failure to make the necessary gear changes and at the correct times may have important practical results in the case of fighter aircraft.

According to this invention a pressure-sensitive capsule is connected to and moves the valves controlling a boost servo motor with a constant action which is determined only by variations in the boost pressure in the engine induction manifold to which the capsule is subjected, and with this capsule actuated valve there is combined a member which is movable independently of and in relation to that valve this member having in it the ports controlled by that valve, and means are provided for moving this ported member and by thus setting it determining datum boost. The servomotor whose valve is thus directly actuated by this capsule controls the boost pressure by moving the engine throttle and by also regulating automatically the operation of the supercharger. The controlling action of the valve of the boost servomotor is determined by the moving in relation to the valve of the ported member and this setting of this member can be effected both by a manually operated lever and automatically by the boost servomotor which can take control of the setting of this member when fall of boost pressure occurs. The operation of the supercharger is regulated by actuation of the change gear through which it is driven this change gear being controlled from the piston of the boost servomotor with a superimposed control by the hand lever. This hand lever is operative to control collectively and in correlation a fuel pump, the engine throttle, the ignition, the ported member which determines the datum of the valve control of the boost servomotor, the setting of the airscrew governor and the setting of the carburetor for weak mixture. It is convenient to employ a piston valve as that which controls the boost servomotor and this valve is acted on by one end of the capsule whose opposite end is fixed. This valve moves within a ported sleeve which as mentioned is primarily moved by the hand lever to determine the datum boost, but on fall of boost pressure can be moved by the boost servomotor.

The apparatus serves to measure fall of boost pressure above certain critical altitudes and this measured fall of boost is used to maintain correct ignition timing and to select the moment for changing gear in the supercharger drive.

In this apparatus the boost control is effected in a manner which may be said to be the reverse of what is customary. In the normal arrangement movement of the hand or pick-up lever serves to give an opening to the throttle which is in excess of that required to give any particular datum boost at ground level and the automatic control then brings back the throttle to the precise opening at which datum boost is just maintained. The angle through which the throttle is thus automatically closed necessarily limits and in fact is normally equal to the amount by which the throttle can subsequently be opened up by the boost control in its efforts to maintain datum boost as the aircraft climbs towards critical altitudes. On the other hand with the "reversed" boost control as here employed practically the whole travel of the piston of the boost servomotor is left available with increasing altitude to open further the throttle beyond the opening given to it by the hand or pick-up lever. As employed in the present apparatus the boost control is able to give full throttle at all datum boosts. This is made possible by the inclusion in the apparatus of an "overrun" mechanism which allows the boost control servomotor to open the throttle fully irrespective of the manual opening associated with the datum boost. The throttle valve itself does not at any time pass beyond the position where it is parallel to the axis of the Venturi passage in which the throttle is placed.

The accompanying drawings illustrate by way of example how the invention may be carried out in practice. The mechanism here described and illustrated may be assembled in a manner which will permit of substantially all the interconnections between the several controls being grouped together in a single box or casing. It is thus arranged as shown in these drawings in which—

Figure 2 is a diagrammatic perspective view showing how certain of the parts in the apparatus are interconnected and operated through these interconnections.

Figure 1:
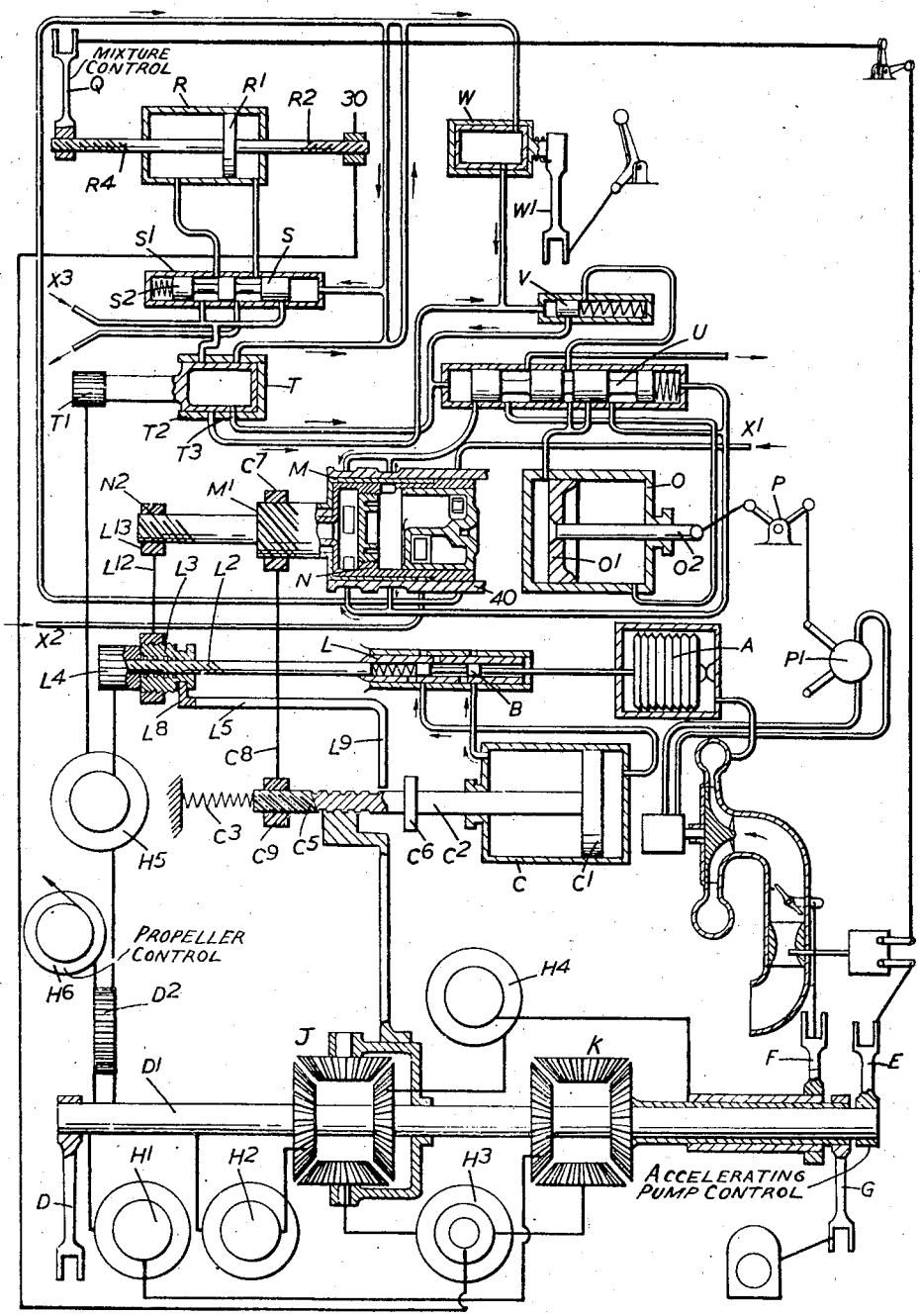
Figure 1 is a diagrammatic view showing the general layout of the whole apparatus.

Figures 3 and 3a are together a sectional elevation, the section being taken on the broken line 3—3 in Figure 8 and showing some of the principal parts of the apparatus shown substantially as they are associated in the control box, these parts including the pick-up or main control lever and the members actuated through the shaft of this lever, the boost servo motor with the valve which controls it, and what may be referred to as the second servo motor which operates the change gear of the supercharger drive and the valves which control this servo motor. This Figure 3 has been divided in order that the parts shown may there appear on a rather larger scale, but it has been thought advisable to show also, as is done in Figure 3b, in a single figure, but on a smaller scale, all that is seen in the two parts of Figure 3. Other figures which represent sections through Figure 3 are on the same scale as Figure 3b wherein the lines on which these sections are taken can be more easily seen.

Figure 4 is a similar view showing other parts of the apparatus which are grouped together including the pressure-sensitive capsule, the section being taken on the line 4—4 in Figure 9.

Figure 5 is again a similar view showing certain valves, the section being taken on the line 5—5 in Figure 7.

Figure 6 is a transverse section on the line 6—6 in Figure 3 looking in the direction of the arrows.

Figure 7 is a transverse section on the line 7—7 in Figure 3 looking in the direction of the arrows.

Figure 8 is a transverse section on the broken line 8—8 in Figure 3 looking in the direction of the arrows.

Figure 9 is a view looking on the end of the apparatus from the left-hand side as it is seen in Figure 3 and with a portion of the casing removed and parts shown in transverse section.

Figure 10 is a part transverse section in the plane of the line 10 in Figure 3.

Figure 11 is an end view, parts being in transverse section, of one of the cam transmission mechanisms as seen in Figure 8, but looked at from the opposite side and shown on an enlarged scale, the view being in effect a section on the line 11—11 in Figure 12, looking in the direction of the arrows and with some parts omitted.

Figure 12 is a section on the broken line 12—12 in Figure 11 looking in the direction of the arrows.

Figure 13 is a section on the line 13—13 in Figure 11 looking in the direction of the arrows.

Figure 14 is a longitudinal sectional elevation on an enlarged scale of the concentric cooperating sleeve valves associated with the changing of the speed gear in the drive of the supercharger.

Figures 15, 16, 17 and 18 are transverse sections of these valves as shown in Figure 14 these sections being taken respectively on the lines 15—15, 16—16, 17—17 and 18—18 in Figure 14 in each case looking in the direction of the arrows which are shown only with the section line 15—15.

In the apparatus now to be described use is conveniently made in several instances of a transmission mechanism forming the subject of abandoned United States Patent application Serial No. 456,064, standing in the names of the present applicants. That mechanism, which for simplicity will herein be referred to as a "cam transmission" is devised for transmitting movement from one rotatable member to a second, separate and coaxial rotatable member. The construction comprises broadly a lever pivoted on and at a distance from the axis of what may be called the first rotatable member, a connection between this lever and the second and separate rotatable member, this connection serving as a means for transmitting movement and imparting rotation to the second member as the first member rotates. As the first member is rotated by suitable means the lever carried by it can be caused to move or to be prevented from moving relatively to that member while it is carried therewith as that member rotates. Such permitted or prevented relative movement between the lever and the first member determines the nature of the movement imparted through the lever to the second member. A particular construction of such a mechanism is illustrated in Figures 11, 12 and 13 of the accompanying drawings and is described hereunder.

In certain places use is also made of differential mechanisms. As employed, each of these mechanisms may conveniently comprise bevel wheels arranged oppositely on the ends of two coaxial and rotatable shafts. Between and in engagement with these bevel wheels are bevel pinions, for example two, arranged oppositely in a cage the rotational position of which can be altered. By thus moving the cage so as to alter the angular position of the pinions the angular relation between the two shafts may be altered, or if one shaft is held against rotation the other shaft will be turned through a determined angle according to the angle through which is turned the cage carrying the bevel pinions.

Certain parts which are here included in this apparatus and dealt with as a whole in combination in this invention form the subject of a separate and copending application for United States of America Letters Patent Ser. No. 458,276, now Patent Number 2,344,547, wherein these parts by themselves are described and claimed as they may be used for general purposes.

Referring first to the diagrammatic view Figure 1, the principal features in the whole apparatus as there shown comprise the following. The pressure-sensitive capsule A actuates a valve B which controls the flow of liquid under pressure to the servo motor C. A pick-up or hand control lever D through the shaft $D^1$ on which it is mounted can move a lever E which is connected to the accelerator pump of the carburettor. The throttle is controlled from the lever F and the ignition from the lever G. In association with the hand lever D and the throttle and ignition controls there are used several of the cam transmission mechanisms referred to above. These are represented in Figure 1 by concentric circles respectively designated $H^1$, $H^2$, $H^3$, $H^4$, $H^5$ and $H^6$, and the connections between the two main parts of each of these mechanisms and the parts with which they cooperate in transmitting movements are represented by lines. Carried on the shaft D, but not directly connected to it, are two differential mechanisms J and K through which and in conjunction with the cam transmission mechanisms $H^1$, $H^2$, $H^3$ and $H^4$, movement can be imparted to the levers F and G from the hand lever D and also from other parts of the apparatus. The differential J is associated with the transmission of movements to the throttle lever F and the differential K is similarly associated with the ignition lever G.

Through gearing and the cam transmission mechanism $H^5$ the hand lever D can set in the longitudinal direction the ported sleeve L within which the valve B is moved by the capsule A. Two concentric ported sleeve valves M and N are rotatable relatively and with respect to ports in the casing which encloses them. Rotation of the outer valve M is caused through gearing by movement of the piston in the cylinder of the servomotor C. Rotation of the inner valve N is caused from the hand lever D through gearing forming part of the mechanism by which that lever moves the ported sleeve L. These valves M and N control the flow of liquid under pressure to the cylinder of a servomotor O which actuates by suitable means a valve P controlling hydraulically a variable speed gear $P^1$ in the drive for a supercharger.

Movement of the hand lever D operating through the cam transmission mechanism $H^6$ can effect a setting of the airscrew governor.

Movement which determines the mixture in the carburettor is transmitted from a lever Q and this lever is caused to turn by movement of the piston in the cylinder of a servomotor R. Movement of this piston $R^1$ will also have an effect through the cam transmission mechanism $H^3$ on the differential K associated with the movement of the ignition lever G. The movement of the piston $R^1$ of the servomotor R is effected by liquid under pressure the flow of which to and from the cylinder of that servomotor is controlled by a piston valve S itself actuated by liquid under pressure the flow of which is controlled on the one hand by the valves M and N and on the other hand by a valve T which is rotated through the gearing from the lever D. This valve T also controls the flow of pressure liquid to actuate a valve U and a valve V, and it also controls the flow of pressure liquid to a valve W rotation of which controls the actuation of the valve V by this pressure liquid. The valve U is as it were subsidiary to the valves M and N in their control of the flow of pressure liquid to operate the servomotor O. As mentioned the latter effects changes in the speed gear in the drive for the supercharger. As can be seen from the run of the pipes or passages indicated by the lines in Figure 1, the pressure liquid entering the interior of the concentric valves M and N passes thence, according to the setting of these valves, to the ported casing in which moves the valve U. As this valve is moved it permits pressure liquid to flow or drain from one end or the other of the servomotor cylinder O. The longitudinal movement of the valve U against the spring acting thereon results, first from a setting of the valve T and secondly after longitudinal movement of the valve V against a spring. This valve is moved either by pressure liquid being permitted to flow by a setting of the valve T or by rotation of the valve W which can be operated by hand through the lever $W^1$ to give optional low gear in the supercharger drive. Movement of the valve V may also allow pressure liquid to enter the casing of the valve U, this supply coming past the valve V and through its casing and being used, according to the position of the valve U, to operate the servomotor O on occasion when a change to low gear is desired in the supercharger drive without a setting of the valves M and N. As can be seen pressure liquid reaches the valve W either through a pipe or passage leading from the casing of the valves M and N, the flow being controlled by the end part of the inner valve N, or from the valve T to the interior of which pressure liquid is supplied.

Liquid under pressure enters the system from some suitable source of supply at the places indicated at $x^1$, where it enters the main part of the concentric valves M and N, at $x^2$ where it enters a small chamber in the end part of the inner valve N, and at $x^3$ where it can enter both the casing of the valve S and also the interior of the valve T. This liquid can drain from within the valves M and N as will be described hereunder and these valves control the drain from the valve U. Drain from the valve S can take place through a port in its casing.

Turning now to the more detailed construction and arrangement of the parts of the apparatus, the pressure-sensitive capsule A, seen in Figures 4, 6 and 8, is placed where it will be exposed to the pressure in the induction manifold of the engine. It is disposed in a chamber $A^1$ which is in communication by passages $A^2$ with the induction manifold. This capsule will thus be sensitive to boost pressure which itself is determined by throttle opening and the operation of the supercharger the latter being variable by alterations in the change-speed gear through which the supercharger is driven. At one end this capsule is fixed in that a projection $A^3$ from the capsule lies in a socket $A^4$ in the end wall of the chamber $A^1$. At its other end the capsule is connected to a member $A^5$ which can slide in a guide $A^6$ and teeth $A^7$ constituting a rack are formed along one side of the sliding member $A^5$. A similar rack is formed by teeth $B^2$, see Figure 3, on the end portion of the valve B; and between these two racks lies a rocking lever $B^3$, part of which is seen in Figure 4 and its position is indicated in chain-lines in Figure 8. Each arm of this lever carries a toothed quadrant, these quadrants engaging the racks $A^7$ and $B^2$, and by this means expansion of the capsule A will cause movement of the valve B against the action of a spring $B^1$ and in the ported sleeve L which itself can be caused to slide within the casing $L^1$ thus altering the position of the ports in the sleeve in relation to the valve B which controls these ports. The expansion and contraction of the capsule A causes the movement of the valve B and this action of the capsule will be constant and determined only by the boost pressure in the engine induction manifold. The valve L may be referred to as the boost valve in that as it is moved by the capsule A it controls the flow of pressure fluid to the cylinder C of a servo motor which may be referred to as the boost servo. The piston $C^1$ in this cylinder C as it moves can have an effect on the one hand on the throttle opening and also on the ignition timing, and on the other hand on the change gear in the supercharger drive.

By moving the ported sleeve L in relation to the boost valve B within it the boost datum will be determined. What may be called the primary movement imparted to the ported sleeve L is effected by a worm thread $L^2$ on the exterior of an end portion of the sleeve and this thread is engaged by a nut $L^3$ which when it is rotated will cause sliding of the sleeve, the latter being restrained against rotation. The arrangement is shown in Figures 1, 2 and 3. Rotation of the nut $L^3$ is caused by movement of the hand lever D acting through a toothed quadrant $D^2$ on its shaft $D^1$, see Figures 1, 2, 3 and 7. This quadrant meshes with a toothed quadrant $D^3$ on a sleeve $D^4$ rotatable on a fixed part $D^5$ and carrying a second toothed quadrant $D^6$. It may be noted that the sleeve $D^4$ with the quadrants $D^3$ and $D^6$ are omitted for the sake of clearness in the diagrammatic Figure 2. The movement is then transmitted through the cam transmission mechanism $H^5$ of which the chief features in its construction are to be seen in Figure 2, but the parts are also to be seen in Figure 7. This device comprises a toothed member $H^{5a}$ on a rotatable part $H^{5b}$ with its teeth meshing with the toothed quadrant $D^6$. The member $H^{5a}$ has pivoted thereto at $H^{5c}$ and lying at one side of it what is in effect a two-armed lever of which the one arm carries or is constituted by a toothed sector $H^{5d}$, while the other arm carries a pin $H^{5e}$ which lies in a cam slot $H^{5f}$ in a member $H^{5g}$ mounted on the part $H^{5b}$ but held against rotation. The toothed sector $H^{5d}$ meshes with teeth $L^4$ on one part of the nut $L^3$. Thus when the hand lever D is moved the movement will be transmitted through the several intermeshing quadrants and the part $H^{5a}$ will be rotated and will carry with it the nut $L^3$. The movement actually given to the nut $L^3$, however, will be determined by the contour of the cam slot $H^{5f}$. With this contour, as shown in Figure 7, as the member $H^{5a}$ turns the nut $L^3$ will at first be caused to turn faster and through a greater angle, but as the pin $H^{5e}$ passes into a different part of the cam slot $H^{5f}$ the nut will be turned at a slower rate and through a lesser arc than that through which the member $H^{5a}$ is turned. Such rotation of the nut $L^3$ will cause a longitudinal movement of the ported sleeve L and it will be appreciated that owing to the interposition of the cam transmission mechanism this movement of the sleeve will not be a regular one as the hand lever is moved through any given angle. While the nut $L^3$ is rotatable it is held against movement in the axial direction by a member through which on occasion the nut without being rotated can be moved in that direction and when so moved it will carry with it the sleeve L. This member $L^5$ can slide on a fixed bar or guide $L^6$ (see Figure 3) against the action of a spring $L^7$, and towards one end it has a forked or like part $L^8$ which engages a groove in the nut $L^3$ while at the other end is a lateral projection $L^9$ through which is imparted to the member $L^5$, in a manner and by means to be described hereunder, a sliding movement against the spring $L^7$ which is transmitted to the nut $L^3$. In this way it is possible to effect an independent or secondary setting of the ported sleeve L. Thus in the first place this sleeve L can be set to a determined datum boost by means of the hand lever D, but when a fall of boost occurs a secondary setting will be effected automatically.

The piston $C^1$ in the cylinder C of the boost servomotor is mounted on the end of a hollow rod $C^2$ within which is a spring $C^3$ whose outer end abuts against a fixed part $C^4$ on the exterior of which are splines engaged by splines within the outer part of the rod $C^2$ which is thus guided by the part $C^4$ and at the same time prevented from turning about its axis. On the outer part of the piston rod $C^2$ is a quick-pitch thread $C^5$ and at the inner end of this threaded part is an annular flange $C^6$ which constitutes a projection adapted to come into contact with the projection $L^9$ when the piston $C^1$ has moved through a certain distance. This will occur on reaching a determined altitude when on any further increase in altitude the resultant movement of the piston $C^1$ will cause it to carry with it the sliding member $L^5$ and thus transmit movement to the ported sleeve L. The whole assembly comprising the capsule A, the valve B, the ported sleeve L and the piston $C^1$ of the boost servomotor will then operate as a follow-up servomotor in which expansion of the capsule A due to any fall of boost will produce a proportional movement of the piston $C^1$.

On the shaft $D^1$ of the hand lever D is a lever E which is connected to the accelerator pump of the carburettor so that enrichment of the mixture will synchronise with rapid opening of the throttle by the hand lever, the throttle being controlled as mentioned from the lever F. The member $H^{5a}$, see Figures 2, 3 and 7, has been described above as forming a part of a cam transmission mechanism through which movement can be imparted to the ported sleeve L from the hand lever D. This member $H^{5a}$ is connected to and rotatable with a member $H^{6a}$, seen in Figure 3, which forms a part of a cam transmission mechanism through which movement can be imparted to the lever 20 by which adjustment of the airscrew governor can be effected in a known manner. This cam transmission mechanism $H^6$ shown in Figures 3, 3a, 3b, and 9 comprises parts arranged and operating in a manner similar to that described above and shown in Figure 7 of which the member $H^{5a}$ forms a part. In this case the member $H^{6a}$ has pivoted thereon at $H^{6c}$ a two-armed member of which one arm carries a toothed sector $H^{6d}$ meshing with a pinion 21 on the shaft 22 of the lever 20 (see Figure 3b). The other arm carries a pin which lies and is movable in the cam slot $H^{6f}$.

For a detailed disclosure of the air screw governor and its controls, reference is made to United States Patent No. 2,217,364 issued to Frank Bernard Halford et al., October 8, 1940. In brief, the governor and control mechanism comprises a fluid pressure system for directing oil at high pressure to a pump and through a controlling valve to an expansible fluid pressure chamber located in the shaft of the air screw and organized so that changes in the volume of the chamber under the influence of pressure fluid serves to rotate the blades of the screw and change the pitch. The mechanism described immediately above and designated generally $H^6$ serves to control the operation of this governor and its related mechanism. By operating the lever 20 this lever 20 constitutes the control by means of which the oil directed to the operating chamber is governed.

The control valve of the air screw governor disclosed by the patent referred to comprises a piston valve that is axially movable by an actuating member, designated $B^7$ in the patent. This actuating member is moved in directions that extend axially of the valve by governor flyweights that are driven by the engine, so that the degree of opening or closing of the fluid pressure line to the blade-rotating pressure chamber is related to engine speed. The actuating member is spring-loaded, and to coordinate the air screw pitch with changing conditions of engine operation, the governing effect of the flyweights upon the actuating member is modified by a link and lever system that is connected with a primary engine-controlling handle and that is also interconnected with various engine control operators, such as an ignition control, a change speed mechanism and a boost control cam. In the device of the patent, this modification of the effect of the flyweights is effected by changing the spring load upon the actuating member, by a sleeve that moves in opposite directions to compress or relieve the helical loading spring. Movement of the sleeve is in directions extending axially of the piston valve, and is disclosed as being accomplished by a gear wheel, driven from the link system and driving a pinion that meshes with a rack carried by the cylinder.

The herein disclosed system may be made effective to operate the governor of the identified patent by a link connection between the sleeve of the governor control and the lever 20 so that movement of the sleeve to alter the loading effect upon the actuating member is initiated by the lever 20 and the mechanism $H^6$, rather than by the link and lever system and the rack and pinion sleeve drive of the said patent. By such connection, movement of the handle D of the instant mechanism in one direction will open the valve supplying fluid pressure to the governor, and opposite movement of the handle will move the valve toward closed position.

By means of this mechanism through which the airscrew governor can be adjusted there will be maintained the correct relation between the position of the hand lever D and engine speed.

As already mentioned, movement of the hand lever D through its shaft $D^1$ will cause movement of the lever F which actuates the throttle, and also the lever G which controls the ignition timing. Involved in this transmission are four cam transmission mechanisms $H^1$, $H^2$, $H^3$ and $H^4$, and two differentials J and K all as indicated diagrammatically in Figure 1. These cam mechanisms are shown more in detail in Figures 7 and 8 and can also be identified in Figure 3a where are seen the two differentials.

Taking first the cam transmission mechanism $H^1$, the member $D^{2a}$ mounted on a sleeve keyed to the hand lever shaft $D^1$ carries the toothed quadrant $D^2$ and also the pivot pin $H^{1c}$ on which can turn the two-armed member which has one arm constituted by the toothed sector $H^{1d}$ while the other arm carries the pin $H^{1e}$ which lies in the cam slot $H^{1f}$ formed in the fixed part $H^{1g}$ (see Figure 7). The toothed sector $H^{1d}$ meshes with a pinion $K^1$ mounted on the one end of a sleeve $K^2$ on the other end of which is mounted the bevel wheel $K^3$ forming a part of the differential K (see Figure 3). The opposite bevel wheel $K^4$ is mounted on the end of a sleeve $G^1$ which at its outer end carries the lever G through which the ignition timing is controlled. With regard to the cam transmission mechanism $H^2$, the member $D^{2a}$ carries also the pivot pin $H^{2c}$ (see Figure 7) on which can turn the two-armed member of which the one arm is constituted by the toothed sector $H^{2d}$ and the other carries the pin $H^{2e}$ which lies in the cam slot $H^{2f}$ in the part $H^{2g}$ which is fixed and in this case conveniently is integral with the part $H^{1g}$ in which is the cam slot $H^{1f}$ of the cam transmission mechanism $H^1$. The toothed sector $H^{2d}$ meshes with a toothed sector $J^1$ mounted on one end of a sleeve $J^2$ on the other end of which is the bevel wheel $J^3$ which forms part of the differential J (see Figure 3a). The opposite bevel wheel $J^4$ is mounted on one end of a sleeve on the other end of which is one part of a two-part member $J^5$, $J^{5a}$ which bridges the differential K and is carried on a bearing beyond the bevel wheel $K^4$. On this part $J^{5a}$ of the member $J^5$ is carried the pin $H^{4c}$ on which turns the two-armed member which carries the toothed sector $H^{4d}$ of the cam transmission mechanism $H^4$. (See Figure 8.) It may be noted that in Figure 3 for the sake of clearance the bridge piece $J^5$ is shown broken away with the one part which carries the pin $H^{4c}$ displaced angularly about the axis of the shaft $D^1$. The pinions $J^6$ of the differential J are carried in a cage member $J^7$ mounted on a sleeve which can turn on the sleeve which carries the bevel wheel $J^4$ and the part $J^5$. This cage member also carries an extension $J^8$ formed as a sector with skew teeth which are in engagement with the teeth $C^5$ on the rod of the piston $C^1$ of the boost servomotor C so that as that piston moves it will swing the cage member $J^7$ about the axis of the shaft $D^1$ and thus alter the relationship between the two bevel wheels $J^3$ and $J^4$. Through the cam transmission mechanism $H^3$ the cage member $J^7$ can turn the member $K^5$ which carries the planetary pinions $K^6$ of the differential K. This member $K^5$ can turn on a part of the shaft $D^1$ which lies between the bevel wheels $K^3$ and $K^4$.

On the cage member $J^7$ is carried the pivot pin $H^{3c}$ of the cam transmission mechanism $H^3$ which together with the cam transmission mechanism $H^4$ can be seen in Figure 8 in end view while their relationship in the longitudinal direction can be gathered from Figure 3. It should be noted that for the sake of clearness in Figure 8 parts of the differential K, which should appear have been omitted. On the pin $H^{3c}$ can turn the two-armed member of which one arm is constituted by the toothed sector $H^{3d}$ while the other arm carries the pin $H^{3e}$ which lies in the cam slot $H^{3f}$ in the member $H^{3g}$. This cam transmission mechanism differs in some respects from the others and is shown more in detail in Figures 11, 12 and 13. In this case instead of the part in which is the cam slot being fixed it is movable the part $H^{3g}$ being formed as a slotted link, as seen in Figure 11, which is suspended at one end from a hollow pin 30 mounted eccentrically on one end portion of the rod $R^2$ of the piston of the servomotor R. Helical splines or teeth $R^3$ on this piston rod engage the eccentric pin or nut 30 so that it will be turned when the piston $R^1$ of the servomotor moves. Towards its other end the link $H^{3g}$ has in it a slot 31 in which lies a guide pin 32 on a bar 33 which can turn or rock in bearings at its ends. With this construction when the piston $R^1$ of the servomotor R moves the position of the whole link $H^{3g}$ will be altered with respect to the axis of the member $K^5$ and consequently the rotational effect in the transmission of movement between the cage member $J^7$, which carries the pivot $H^{3c}$ and the member $K^5$ will be varied.

Through the cam transmission mechanism $H^4$ movement is transmitted to the throttle lever F. This lever is mounted on one end of a sleeve $F^1$ on the other and inner end of which is a toothed sector $F^2$ with which meshes the toothed sector $H^{4d}$ on the one arm of the member whose other arm carries the pin $H^{4e}$ lying in the cam slot $H^{4f}$ (see Figure 8).

Thus movement is transmitted from the hand lever D to the throttle lever F by way of the member $D^{2a}$, the cam transmission mechanism $H^2$, the bevel wheels $J^3$ and $J^4$ of the differential J, the bridge piece $J^5$ and the cam transmission mechanism $H^4$. Movement is transmitted from the hand lever D to the ignition control lever G first through the cam transmission mechanism $H^1$, and then through the bevel wheels $K^3$ and $K^4$ of the differential K. The throttle lever F can be moved by the piston $C^1$ of the boost servomotor acting through the member $J^8$ and turning the cage $J^7$ with the pinions $J^6$ of the differential J whereby since the bevel wheel $J^3$ is held against rotation the bevel wheel $J^4$ will be turned with the effect mentioned above. The rotation of the cage $J^7$ acting through the cam transmission mechanism $H^3$ will swing the bevel pinions $K^6$ of the differential K and cause the bevel wheel $K^4$ to turn with effect on the ignition lever G. As already mentioned some adjustment will be made in the cam transmission mechanism $H^3$ when the piston $H^1$ of the servomotor R is caused to move.

No matter what may be the datum boost and the associated manual throttle opening, the ported sleeve L is always picked up by the boost piston $C^1$ through the member $L^5$, $L^8$, $L^9$, at the same point in the stroke of that piston. Thus the attainment of actual full throttle is always identified by a definite and constant angular position of the bevel pinion cage $J^7$ in the throttle differential J. As mentioned above this cage $J^7$ is connected to the bevel pinion carrier $K^5$ of the differential K associated with the ignition timing the connection being through the cam tranmission mechanism $H^3$. The design of this cam transmission mechanism is such that no movement of the pinion carrier $K^5$ will take place until the pinion cage $J^7$ has been moved into a position corresponding to pick-up of the ported sleeve L by the boost servo piston $C^1$. From that point the two differentials J and K rotate in company to advance the ignition an amount proportional to the fall of boost.

To recapitulate, the pick-up or hand lever D is directly connected to the plate $D^{2a}$ on which is the toothed sector $D^2$ and this actuates the cam tranmission mechanism $H^5$ through which movement is imparted to the ported sleeve L. It also actuates the cam transmission mechanism $H^6$ by which adjustment of the airscrew governor is effected. The sector plate $D^{2a}$ also carries the pivot pin $H^{1c}$ which actuates the cam transmission mechanism $H^1$, through which the throttle is actuated from the pick-up lever, and also the pivot pin $H^{2c}$ of the cam transmission mechanism $H^2$ through which the ignition timing is adjusted. The cam transmission mechanism $H^1$ provides the means whereby there may be obtained the desired relationship between the hand lever movement and the throttle opening effected by this lever D. In accordance with the above described arrangement for the reversed boost control the full range of throttle opening effected by movement of the hand lever D is preferably less than the movement requisite to open the throttle valve fully. Consequently there exists a mechanical advantage in the control which is available to reduce the manual effort necessary to open the throttle. The cam transmission mechanism $H^2$ and the differential K through which manual adjustment of the ignition timing can be effected, enables correct timing to be obtained for all engine speeds at corresponding datum boosts and under normal rich mixture conditions.

The controls indicated are grouped and enclosed in a suitable casing. Within this casing are disposed all the principal parts referred to above and the only connections external to this casing comprise the links respectively to the throttle valve from the lever F, to the accelerator pump from the lever E and the weak mixture lever on the carburettor from the lever Q, to the ignition unit servo from the lever G, to the governor from the lever 20, and to the change-speed lever of the supercharger gear $P^1$. Two connecting links pass to the pilot's cockpit for the hand lever D and for the optional low gear lever $W^1$. In addition there are the usual boost pressure connections and oil pipes both for supplying liquid under pressure and for drainage.

The weak mixture necessary for economical cruising is brought into operation over the appropriate range of engine speed by means of the separate small servomotor R the movement of the piston $R^1$ in which is controlled by the rotary valve T actuated by gearing from the shaft $D^1$ of the hand lever D. The gearing through which this valve T is rotated is arranged as follows, reference being made more particularly to Figures 1, 2, 4 and 7. On the end of the valve T are teeth $T^1$ and these mesh with the toothed sector $H^{5a}$ which is the driving member of the cam transmission mechanism $H^5$. As has been mentioned above this sector $H^{5a}$ meshes with the toothed quadrant $D^6$, see Figure 7, which is integral with the toothed quadrant $D^3$ in mesh with the toothed quadrant $D^2$ on the shaft of the hand lever D. Thus according to the position of the lever D liquid under pressure will be admitted to one side or the other of the piston $R^1$ of the weak mixture control servomotor R. In this way the employment of a weak mixture becomes compulsory over a certain range of engine speed and in relation to the determined datum boost.

As has been stated in the previous general description of Figure 1 the actual control of the admission to and outflow from the cylinder of the servomotor R is effected by movement of the valve S, but this valve is moved by pressure liquid the flow of which to the valve S is controlled by the valve T and also by the concentric and cooperating valves M and N which will be more fully described hereunder. Liquid under pressure enters at $x^3$ and passes to ports in the casing $S^1$ of the valve S and separately also to a port in the casing $T^2$ of the valve T. Thus when rotation of the valve T, due to a movement of the hand lever D, permits pressure liquid to flow into the valve casing $S^1$ and move the valve S against the spring $S^2$ which acts thereon, pressure liquid will be admitted to one end of the servomotor cylinder R and the other end of this cylinder will be open to drain. The nature of this control of the weak mixture is such that while a slow movement of the hand lever D will cause weak mixture to operate over the determined speed range, on the other hand a rapid movement of the hand lever, as may occur when accelerating for the take-off of the aircraft, will not cause weak mixture to be introduced but normal rich mixture will be maintained.

Movement to determine the mixture is transmitted to the carburettor from the lever Q which can turn about the axis of the piston rod $R^2$, but cannot move in the direction of this axis. The rod has on it helical splines $R^4$ this part of the rod $R^2$ extending from the piston $R^1$ in the opposite direction to the part of this rod on which are the helical splines $R^3$ through which movement is transmitted to the cam slot member $H^{3g}$ of the cam transmission mechanism $H^3$, see Figures 4, 11 and 12. If therefore the piston $R^1$ is caused to move it will turn the lever Q and at the same time cause an adjustment in the cam transmission mechanism $H^3$ which will have an effect on the ignition control as transmitted from the hand lever D to the lever G in the manner described above. This will bring about an advance in the ignition for weak mixture conditions, but the timing of the ignition will remain correct over the entire engine speed range irrespective of whether the hand lever is moved fast or slowly. At extra high altitudes when the power output is not much greater with normal mixture than with weak mixture, the weak mixture can be brought into operation automatically by indirect action from the capsule A in a manner to be described hereunder.

The mechanism which affects the changing of the gear in the supercharger drive comprises a servomotor O the piston $O^1$ of which operates through its rod $O^2$ a spring-loaded trip device which actuates a valve P controlling by hydraulic means the gear change mechanism $P^1$ (see Figure 1). The movement of the piston $O^1$ is controlled by two cooperating valves constituted conveniently by two concentric ported sleeves M and N. These can be moved relatively and by separate mechanisms the movement of each sleeve being a rotational one. The conditions which have to be satisfied with respect to the automatic changing of the gear $P^1$ in the supercharger drive are that at certain altitudes dependent upon the speed of the engine the valves M and N will permit pressure fluid to flow to the servomotor O and cause it to bring about the gear change. In order to avoid hunting in the gear change there must exist a sufficient difference between the altitudes at which high and low gears are engaged respectively while climbing and while descending. These conditions are met by elaboration of the boost control mechanism while still employing only one pressure-sensitive capsule A subjected to variations in boost pressure. Hence the altitudes at which gear change is to occur are identified by this mechanism in terms of a fall in boost pressure below the datum boost which has been selected. It is not, however, sufficient to measure only the fall of boost because there may occur similar falls of boost in both high and low gears. Thus unless this difficulty is overcome the mechanism will not be able to distinguish between falls of boost at different altitudes. This difficulty is overcome in the present mechanism by correlating the fall of boost with throttle valve opening.

There will now be described the means by which these valves M and N are rotated reference being made more especially to Figures 2, 3, 6 and 10. The outer valve M of these two concentric valves is rotatable in a ported casing 40 which as seen in Figure 3, may conveniently be coaxial and even integral with the cylinder O of the servomotor by which the change gear of the supercharger drive is operated. On an extension from the valve are skew gear teeth $M^1$ which mesh with a worm wheel $C^7$ on one end of a shaft $C^8$ on the other end of which is a worm wheel $C^9$ meshing with the skew teeth $C^5$ on the rod $C^2$ of the piston $C^1$ in the cylinder of the boost servomotor C, see Figures 2 and 6. Thus movement of this piston will rotate the valve M. The inner valve N has a tubular extension $N^1$ through which pressure liquid can drain away from within the valve. The nut $L^3$ by the rotation of which movement is given to the ported sleeve L, has on a part of its exterior skew teeth $L^{10}$ in addition to the straight teeth $L^4$ through which rotational movement is imparted to the nut from the hand lever D. These teeth $L^{10}$ mesh with a worm wheel $L^{11}$ on one end of a shaft $L^{12}$ on the other end of which is a worm wheel $L^{13}$ meshing with skew teeth $N^2$ on the end portion of the extension $N^1$ from the valve N, see Figure 10. Thus when the nut $L^3$ is turned it will cause the valve N also to be turned within the valve M. In this way these two concentric valves M and N can be rotated independently and so caused to cooperate. Since variation of boost pressure with altitude, acting through the movement of the piston $C^1$ of the boost servomotor, will effect a setting of the pinion carrier $J^7$ in the differential J associated with movement of the throttle lever F, there will be a relation between throttle setting as effected from the capsule A and a setting of the valve M which partakes in the control of the gear change in the supercharger drive. On the other hand it will be apparent that there is a relation between the selection of boost datum by the setting of the ported sleeve L from the hand lever D, and the rotation of the inner sleeve N and the part that this valve takes in the control of the gear change. The initial angular position of the inner valve N is therefore in accordance with the selected boost datum. The moment when the ports in the valves M and N will cooperate to bring about a change to high gear will therefore depend on (a) the angular movement of the outer valve M from a constant initial position, (b) the angular movement of the inner valve N from its initial position which is variable, and (c) the initial position of the valve N which is determined by the datum boost selected. Ports in the sleeve valves M and N are arranged to register at any required fall of boost below the datum boost selected by the hand lever D and when this occurs pressure liquid will be caused to flow to the servomotor O and the valve P will be operated to bring high gear into use.

The change in the supercharger drive into high gear is required above the critical altitude when the boost pressure has fallen below the datum and the pinion carrier $J^7$ of the differential J has been moved into its overrun position. On the other hand the change back into low gear is wanted when the boost pressure is at datum level and this pinion carrier $J^7$ is in a position corresponding to some partially closed position of the throttle. The angular positions of the low gear ports in the valves M and N are arranged accordingly and may be disposed so as to cause low gear to be engaged at an altitude which is at some desired figure below that altitude at which the change into high gear occurs.

At very high altitudes the boost pressure will eventually fall so low that a change-over to weak mixture will give an economy of fuel without substantial loss of engine power. It is therefore arranged in this apparatus that when at a high altitude the boost pressure has fallen to a determined figure, the piston $R^1$ of the servomotor which controls the fuel mixture will move the lever Q to the weak mixture position. By reference to Figure 1 it will be seen that this can result from a setting of that part of the inner valve N which controls the flow of pressure liquid through a circuit which will cause this pressure to act on and move the valve S. This rotational setting of the valve N will be caused when a predetermined fall of boost from the datum boost has occurred at high altitude as described hereunder.

There will now be described the detail construction of the concentric valves M and N and also the arrangement and operation of the valves U, V and W and their association with the valves M and N in the control of the servomotor O which effects the gear changes. Reference should be made to the detail views of the valves M and N in Figures 14 to 18, also to Figures 5, 7 and 9, and to Figure 1 for the general interrelation between these valves.

With respect to the valves M and N it should be noted that such valves together with other parts of the present apparatus, namely the capsule A, the servomotor C with its valve B actuated by the capsule, the ported sleeve adapted to be set by means of a hand lever, and means for rotating the valve M by movement of the piston of the servomotor C, and means for rotating the valve N when the hand lever is moved, all in combination for the purpose of controlling mechanism, form the subject of a copending application for United States of America Letters Patent Serial No. 458,276 by the present applicants. In that case these parts are described as intended for use by themselves or otherwise and for such purpose as may be desired. In the present application however, these parts are employed not by themselves, but as forming part of a general combination and as cooperating with other apparatus, as herein described, in the control of an internal combustion engine as used for the propulsion of an aircraft.

It will be seen from Figure 14 that within the inner sleeve valve N is a transverse partition $N^3$ which separates off a chamber $N^4$ open to the interior of the hollow shaft $N^1$. As mentioned above pressure liquid can drain through this shaft and from the chamber $N^4$ as a result of the appropriate setting of the valves M and N this liquid having come from the cylinder of the servomotor O. In the part of the sleeve valve N which surrounds this chamber $N^4$ there are ports $N^5$ and $N^6$ which can be brought alternatively into register, by relative rotation of the valves M and N, with a port $M^2$ in the part of the sleeve valve M which surrounds this part of the valve N. These ports can cooperate with either the port 41 or the port 42 in the casing 40 (see Figure 15) these ports being in communication by pipes or passages indicated in Figure 1 which run to the casing of the valve U. Through these ports in the casing 40 pressure liquid can flow away from either end of the cylinder O by way of the casing of the valve U as determined by the position of that valve. The valves M and N can thus control the movement of the valve U by pressure liquid entering at the end of its casing, as shown in Figure 1, and also the flow of pressure liquid into the main part of the casing of the valve U which in turn controls the flow of this liquid to the servomotor O. The valves M and N also control the drain of liquid from the end and main part of the casing of the valve U.

Referring now to the transverse section shown in Figure 16 it will be seen that in this part of the sleeve valve N there are two ports $N^7$ and $N^8$ and either of these by rotation of the valve may be brought into register with a single port $M^3$ in the outer sleeve valve M. By suitable rotation of the two valves these cooperating ports may be brought into register with the port 43 or the port 44 in the casing 40. Of these the port 43 communicates by a pipe or passage with a port in the casing of the valve U and through this port pressure liquid from within the valve N can pass into the casing of the valve U and thence into the right hand end of the cylinder O of the servomotor. At this time the relative positions of the valves M and N will be such that the drain ports $N^6$, $M^2$ and 42 will all be in register (see Figure 15) so that pressure liquid can flow away from the casing of the valve U and thus from the left-hand end of the servomotor cylinder O, the liquid passing into the chamber $N^4$ and then away to drain through the shaft $N^1$. The port 44 (see Figure 16) in the casing 40 communicates with a port in the casing of the valve U and therefore when the ports $N^8$ and $M^3$ are in register and also with this port 44 pressure liquid can flow into the casing of the valve U and thence to the left-hand end of the cylinder O as seen in Figure 1, causing the piston $O^1$ to move to the right. This is possible since at this time the ports $N^5$ and $M^2$ will be in register and also with the port 41 (see Figure 15) thus permitting pressure liquid to flow from the right-hand end of the cylinder O into the casing of the valve U and from that casing into the chamber $N^4$ and thence away through the hollow shaft $N^1$.

The chamber $N^9$ formed within the main part of the sleeve N is closed by a plug 50 in which is a partition 51 separating off a chamber 52. Into the chamber $N^9$ liquid under pressure can enter through a port 45 in the casing and a port $N^{10}$ in the valve N when these ports are in register (see Figure 18). The port $N^{10}$ leads from the corresponding opening in the wall of the plug 50. The supply of this pressure liquid comes from a suitable source by way of the point $x^1$. Pressure liquid coming from the source $x^2$ can enter the chamber 52 through a port 46 in the casing, a port $M^4$ in the sleeve valve M and a port $N^{11}$ in the valve N (see Figure 17). This liquid can flow through a port $N^{12}$ and a port 47 in the casing (see Figure 18). As indicated in Figure 1 pressure liquid admitted to the chamber 52 passes from this chamber through these ports either to the valve W or to act on the end of the valve S and move this valve against the spring $S^2$. It will be seen that at this end the wall of the sleeve valve N is thickened to lie against the interior of the casing 40 since the sleeve valve M is of less length than the valve N.

By suitably designing the gearing through which is moved the ported sleeve L within which lies the boost valve B, and in conjunction with this the gearing $L^{10}$, $L^{11}$, $L^{13}$ and $N^2$, it is possible to rotate the sleeve valve N with a fall of boost at the same rate at which it was rotated in the opposite direction when being set by the hand lever D when this was moved to select the datum boost by moving the sleeve L. Consequently the position of the port $N^{12}$ in the enlarged end part of the valve N in relation to the port 47 will be in accordance with the actual boost pressure obtaining at any moment in the engine induction manifold. By this means there is provided weak mixture automatically when the boost pressure has fallen to a predetermined figure at a high altitude and irrespective of the engine speed since, as described above, the ports leading into and from the chamber 52 determine the flow of pressure liquid which can act on the valve S and thus cause movement of the piston in the servo motor R and resultant movement of the lever Q which is connected to the carburettor. In order that this effect shall not take place when the same low boost pressure is in operation at a low altitude the supply of pressure fluid whose flow is controlled by this part of the valve N is cut off by the port $M^4$ in the valve M (see Figure 17) except when the throttle has reached the fully open position.

It is desirable that the pilot shall be able to override the automatic gear change in order to effect economical cruising at high altitudes. At the same time it must be possible for him to exercise this option only when a weak fuel mixture is being used. This condition is met by providing the override control valve W, already referred to, which, as is to be seen from Figure 1, is dependent for the flow of pressure liquid thereto upon the pressure liquid circuit which is operative to move the valve S and bring about a weak mixture through the servomotor R and the lever Q. Pressure liquid can also flow to the valve W from the valve T to which this liquid comes at $x^3$ (Figure 1). Thus this override valve W is only effective when pressure liquid has been allowed to flow into the circuit controlling the weak mixture. As can be seen from Figure 1 one supply of pressure liquid comes from the chamber 52 in the rotatable sleeve valve N and when this valve is set so as to permit this flow, the pressure liquid can act on and move the valve S which controls the movement of the piston $R^1$ in the servomotor R.

Above the altitude at which this override becomes operative the pilot cannot pass from high gear in the supercharger drive at the higher boost pressures to economical cruising in low gear without first passing through the conditions of economical cruising in high gear. In this way the possibility of there being a disconcerting fall of engine power is avoided.

It may not always be desirable to change up to a high gear in the supercharger drive at engine speeds in excess of a determined maximum. This requirement is provided for by adding a port to the valve T which is actuated by the hand lever. By means of this port $T^3$ the valve T can control the flow of pressure fluid which actuates the valve U in such a way as to open the pressure liquid circuit of the servomotor O to drain. This prevents the change into high gear when any engine speed above the determined maximum is selected by the hand lever. The automatic change down to low gear remains unaffected and operates at all engine speeds.

It would be possible to arrange the conventional type of boost control with a reversed action so that in the event of puncture of the capsule there would result one or other of the following effects. First the piston of the boost servomotor would be caused to go permanently to the altitude position and this would leave the pilot with little choice of being able to use anything much less than maximum engine power and in consequence landing of the aircraft would be dangerous. Alternatively the effect would be to cause the piston of the boost servo motor to go permanently to the "ground" position, when the pilot would be free to land safely, but would have only low engine power available at any material altitude. In contrast to this in the present invention the use of reversed action boost control does not suffer from either of these objections. Owing to the method adopted in this invention of selecting datum boost by setting of the sleeve L the ports in which are controlled by the valve B of the boost servomotor C, this valve being moved directly by the capsule A instead of by a compression adjustment of the capsule itself, then if this capsule is punctured the pilot is left with control of the engine power from maximum down to fully closed throttle.

In any engine it is necessary to cut out the action of the boost control over the lower range of pick-up movement so that adequate control may be maintained for taxying on the ground. When reversed action boost control is used as in the present case this necessitates keeping the piston of the boost servomotor C in the "ground" position. In the present arrangement this is effected by setting of the ported sleeve L and selection of a datum boost which is lower than can easily be maintained with a degree of manual adjustment of the throttle opening for which provision has been made. For example normally this selected datum boost might be about minus four pounds.

In the present apparatus in the event of the capsule A being punctured its expansion is limited by coming into contact with some part of the casing. Then the condition necessary for maintaining full engine throttle with a punctured capsule is that the selected datum boost at zero position of the hand lever D shall be less than that corresponding to the maximum expansion permitted to a punctured capsule.

It is proposed to use a capsule of normal design the one end of the capsule being fixed in a sense permanently by a part $A^3$ carried by the capsule engaging the fixed member $A^4$, the arrangement being such as only to give provision for such primary adjustment as may be necessary without any means of alteration during operation so that the capsule is constant in its action in moving the valve B of the boost servomotor.

What we claim as our invention and desire to secure by Letters Patent is:

1. In apparatus for the control of internal combustion engines as used for the propulsion of aircraft said engines including the usual manifold, supercharger, timer, throttle, supercharger drive, airscrew and governor of usual construction, the combination of a hand lever operative to control the fuel supply, a differential gear and means by which this hand lever is operative through this gear to actuate the throttle, a second differential gear with means whereby the said hand lever is operative through this differential gear to vary the ignition timing, a ported sleeve with gearing through which this sleeve can be moved by the said hand lever, a pressure sensitive capsule disposed where it will be subject to the boost pressure in the engine induction manifold the capsule having a constant action determined only by this boost pressure, a valve disposed and movabe within the said ported sleeve and controlling the ports in that sleeve which can be moved by the said hand lever in relation to the valve, means by which this valve is moved by the said capsule, a boost servomotor controlled by the said capsule-actuated valve, a second servomotor operative to bring about a gear change in the drive to a supercharger, means by which the said second servomotor is controlled by the said boost servomotor, means whereby the said boost servomotor is operative through the said first differential gear to actuate the throttle, and means whereby the said hand lever can control the said second servomotor and is also operative on the airscrew governernor.

2. Apparatus for the control of internal combustion engines as used for the propulsion of aircraft comprising in combination the features set out in claim 1 in which there is combined with the said controls at least two mechanisms for imparting movement from one rotating member to a second separate but coaxial rotatable member, each such mechanism comprising in combination a lever pivoted on and at a distance from the axis of the said first member, a connection between this lever and the said second member, and means whereby as the first member is rotated the lever will be caused to move or will be restrained from moving relatively to the first member, the action of such constraining means on the lever determining the movement if any imparted to the second member as the first member rotates.

3. In apparatus for the control of internal combustion engines as used for the propulsion of aircraft said engines including the usual manifold, supercharger, timer, throttle, supercharger drive, air screw and governor of usual construction, the combination of a hand lever, means whereby movement of this lever is operative to determine the datum boost and to control respectively the throttle, the ignition timing, the fuel mixture for economical cruising, the setting of the airscrew governor, and under certain conditions the gear change in the supercharger drive, a pressure-sensitive capsule disposed where it will be subject to the boost pressure in the engine induction manifold the capsule having a constant action determined only by this boost pressure, a valve with means by which this valve is actuated by the said capsule, a servomotor actuated by liquid under pressure the flow of pressure liquid to the servomotor being controlled by the said capsule-actuated valve, and means whereby this servomotor controls automatically the gear change in a supercharger drive with means for associating low gear with weak fuel mixture, and means whereby at ultra high altitudes this servomotor controls the carburettor setting for weak mixture.

4. Apparatus for the control of internal combustion engines as used for the propulsion of aircraft comprising in combination the features set out in claim 1 in which means are provided whereby the hand lever remains effective to control engine power in the event of failure of the capsule as from puncture.

5. In apparatus for the control of internal combustion engines as used for the propulsion of aircraft said engines including the usual manifold, supercharger, timer, throttle, supercharger drive, airscrew and governor of usual construction, the combination of a pressure sensitive capsule disposed where it will be subject to the boost pressure in the engine induction manifold this capsule having a constant action determined only by this boost pressure, a servomotor actuated by liquid under pressure, a piston valve controlling the flow of pressure liquid to this servomotor, means by which this valve is actuated by the said capsule, a ported sleeve within which the said capsule-actuated valve lies and can be reciprocated, this sleeve being movable in the direction of its axis to alter the position of the ports therein in relation to the said piston valve within it, a second servomotor actuated by liquid under pressure and operative to vary a speed gear in the drive for a supercharger, two concentric valves which co-operate and control the flow of pressure liquid to and thus the action of the said second servomotor, a hand lever, means by which this hand lever is operative to actuate the throttle, control the ignition timing and the fuel supply, move the said ported sleeve and set the airscrew governor, means by which the said first servomotor can actuate one of the said concentric valves and thereby control the operation of the said second servomotor, means whereby the said first servomotor can control the throttle opening, means by which the second of the said concentric valves can be actuated by the said hand lever and also by the said first servomotor after its piston has moved a determined distance, a third servomotor actuated by liquid under pressure and operative to vary the fuel mixture and also take effect on the mechanisms which respectively set the throttle and the ignition timing, means by which the action of this third servomotor is controlled by the said hand lever, and means whereby the action of the said third servomotor can also be controlled by that one of the said concentric valves which is actuated by the said first servomotor.

6. Apparatus for the control of internal combustion engines as used for the propulsion of aircraft comprising in combination the features set out in claim 5 in which a second hand lever is provided with a valve moved thereby which controls the flow of pressure liquid which is operative to cause the said second servomotor to effect a change into low gear in the gear drive for the supercharger.

7. In apparatus for the control of internal combustion engines as used for the propulsion of aircraft said engines including the usual manifold, supercharger, timer, throttle, supercharger drive, airscrew and governor of usual construction, the combination of a pressure sensitive capsule, a casing enclosing this capsule, an abutment anchorage for the one end of this capsule in the said casing this abutment except for primary setting being fixed, a pipe connection between this casing and the engine induction manifold such that the capsule will be subjected to changes in the boost pressure in that manifold, a servomotor actuated by liquid under pressure, a sliding valve controlling the flow of pressure liquid to this servomotor, a connection between the said capsule and this valve such that when the capsule is caused to expand or contract, it will actuate the valve, a movable member in contact with which the said valve slides, ports in this movable member which are controlled by the valve as it slides, connections for the pressure liquid between the ports in this movable member and the said servomotor, means for moving this ported member and thereby altering the position of the ports therein in relation to the said capsule actuated valve, a supercharging blower delivering into the engine induction manifold and determining the boost pressure in that manifold, means for varying the effective operation of this supercharger, and means whereby the said servomotor controls the operation of the supercharger and thus controls the boost pressure.

FRANK BERNARD HALFORD.
PERCY JOHN WALLACE.